US008451251B2

(12) United States Patent  
Choi et al.

(10) Patent No.: US 8,451,251 B2  
(45) Date of Patent: May 28, 2013

(54) LIGHT SENSING CIRCUIT, TOUCH PANEL INCLUDING THE SAME, AND METHOD OF DRIVING THE SAME

(75) Inventors: Deok-Young Choi, Yongin (KR); Yong-Sung Park, Yongin (KR); Do-Youb Kim, Yongin (KR); Soon-Sung Ahn, Yongin (KR); In-Ho Choi, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 621 days.

(21) Appl. No.: 12/720,204

(22) Filed: Mar. 9, 2010

(65) Prior Publication Data

US 2011/0001711 A1 Jan. 6, 2011

(30) Foreign Application Priority Data

Jul. 3, 2009 (KR) ........................ 10-2009-0060828

(51) Int. Cl.  
*G09G 5/00* (2006.01)

(52) U.S. Cl.  
USPC .......................... 345/175; 345/207; 178/18.09

(58) Field of Classification Search  
USPC ................. 345/173, 175, 179, 182, 204, 207; 178/18.09, 19.05  
See application file for complete search history.

(56) References Cited

U.S. PATENT DOCUMENTS

| | | | |
|---|---|---|---|
| 6,392,617 B1 * | 5/2002 | Gleason | 345/82 |
| 7,502,001 B2 * | 3/2009 | Fish et al. | 345/81 |
| 7,602,387 B2 * | 10/2009 | Fish | 345/207 |
| 7,688,370 B2 | 3/2010 | Hur et al. | |
| 7,859,486 B2 * | 12/2010 | Kwon | 345/66 |
| 2003/0032213 A1 * | 2/2003 | Yonezawa et al. | 438/48 |
| 2005/0225546 A1 * | 10/2005 | Akimoto | 345/207 |
| 2009/0015166 A1 | 1/2009 | Kwon | |
| 2011/0122111 A1 * | 5/2011 | Brown et al. | 345/207 |

FOREIGN PATENT DOCUMENTS

| | | |
|---|---|---|
| KR | 10-0672625 B1 | 1/2007 |
| KR | 10-0691023 B1 | 2/2007 |
| KR | 10-0824859 B1 | 4/2008 |
| KR | 10-2009-0072779 | 7/2009 |

OTHER PUBLICATIONS

Korean Registration Determination Certificate issued in corresponding Korean Application Serial No. 10-2009-0060828 dated Sep. 28, 2011 (5 sheets).

KIPO Office action dated Jan. 7, 2011, for Korean priority Patent application 10-2009-0060828, noting listed reference in this IDS.

* cited by examiner

*Primary Examiner* — Tom Sheng  
(74) *Attorney, Agent, or Firm* — Christie, Parker & Hale, LLP

(57) ABSTRACT

A light sensing circuit includes a photodiode including a cathode electrode and an anode electrode and for receiving light from the outside and generating a current corresponding to the received light, a driving transistor for amplifying the current generated in the photodiode, a capacitor for storing a first initiation voltage transmitted to the driving transistor, a first switching transistor for compensating for a threshold voltage of the driving transistor corresponding to a current scan signal, and a second switching transistor for transmitting the first initiation voltage corresponding to the current scan signal.

19 Claims, 4 Drawing Sheets

LIGHT SENSING CIRCUIT, TOUCH PANEL INCLUDING THE SAME, AND METHOD OF DRIVING THE SAME

CROSS-REFERENCE TO RELATED APPLICATION

This application claims priority to and the benefit of Korean Patent Application No. 2009-0060828, filed on Jul. 3, 2009, in the Korean Intellectual Property Office, the disclosure of which is incorporated herein in its entirety by reference.

BACKGROUND

1. Field

The following description relates to a light sensing circuit, a touch panel including the light sensing circuit, and a method of driving the light sensing circuit.

2. Description of the Related Art

A mouse or keyboard is generally used to input signals to a computer. Also, a remote control is used to select specific functions in a digital television. However, users who are unfamiliar with such devices may experience difficulties in properly using them.

A touch panel or a touch screen is a new input device concept which may be used by less experienced users. In this case, when a user wants to input signals to a computer or digital television, the user directly touches the touch panel by using a finger or a pen.

Touch panels may be classified as a capacitive sensing type, a resistive touching type, an infrared beam sensing type, a surface acoustic wave type, an integral strain gauge type, a Piezo effect type, or a light sensing type, according to a method of recognizing input signals.

The light sensing type touch panel comprises a display including a photodiode, where a finger's touch is recognized by sensing a current generated by light incident on the photodiode. The photodiode may be manufactured when manufacturing a driving circuit of the display which may be, for example, a liquid crystal display (LCD) or an organic light emitting diode (OLED) display. Also, as in the case of the resistive touching type touch panel or the capacitive sensing type touch panel, a separate layer may not be needed outside of the display, and thus the thickness of the light sensing type touch panel may be reduced.

However, a current value of the photodiode used in the light sensing type touch panel is very low. For example, there may only be a slight change in current according to an applied voltage value, and a photodiode area and the current generated in the photodiode is small, on the order of about a few to several tens of pA.

In addition, the light sensing type touch panel includes a plurality of pixel circuits for displaying gradation and a plurality of light sensor circuits for sensing touch of pixels. Thin film transistors (TFTs) are used to amplify a current of the photodiode in the plurality of light sensor circuits. As threshold voltages $V_{th}$ of driving transistors for amplifying a current vary due to fabrication and/or manufacturing variables, causing output values of each light sensor circuit to vary, the accuracy of touch determination or touch location determination is reduced or compromised.

SUMMARY

Some non-limiting example embodiments of the present invention include a light sensing circuit, which may amplify a current generated in a photodiode and compensate for a threshold voltage deviation of a driving thin film transistor (TFT), a touch panel including the light sensing circuit, and a method of driving the light sensing circuit.

According to some non-limiting example embodiments of the present invention, a light sensing circuit for amplifying a current of a photodiode includes: a photodiode including a cathode electrode and an anode electrode and for receiving light from the outside and generating a current corresponding to the received light, a driving transistor for amplifying the current generated in the photodiode, a capacitor for storing a first initiation voltage transmitted to the driving transistor, a first switching transistor for compensating for a threshold voltage of the driving transistor corresponding to a current scan signal, and a second switching transistor for transmitting the first initiation voltage corresponding to the current scan signal.

The driving transistor may be a PMOS transistor having a gate electrode connected to one terminal of the capacitor, a source electrode connected to the second switching transistor, and a drain electrode connected to the first switching transistor.

The first switching transistor may be a PMOS transistor having a source electrode connected to a drain electrode of the driving transistor and a drain electrode connected to a gate electrode of the driving transistor, and for compensating for a threshold voltage of the driving transistor by diode connecting the driving transistor corresponding to the current scan signal.

The light sensing circuit may further include a third switching transistor for transmitting a second initiation voltage which initiates a voltage of the cathode electrode of the photodiode and a voltage at a gate electrode of the driving transistor corresponding to a previous scan signal received before the current scan signal.

The light sensing circuit may further include a fourth switching transistor for transmitting a power source voltage to the driving transistor corresponding to an emission signal.

The second initiation voltage and the power source voltage may be respectively the same as a corresponding initiation voltage and a corresponding power source voltage of a separate pixel driving circuit which drives a plurality of pixels.

The fourth switching transistor may be included in a pixel emission driver which transmits an emission signal to a separate pixel driving circuit which drives a plurality of pixels.

The light sensing circuit may further include a third switching transistor for transmitting the current amplified through the driving transistor via an output line corresponding to a light integration signal.

The light sensing circuit may further include a fourth switching transistor for resetting a voltage of the output line to a ground voltage corresponding to a reset signal.

A line for transmitting the current scan signal may be included in a separate pixel driving circuit.

The second switching transistor may be included in a pixel scan driver which transmits a scan signal to a separate pixel driving circuit which drives a plurality of pixels.

According to some non-limiting example embodiments of the present invention, a touch panel includes a pixel driving circuit for driving a plurality of pixels for displaying images and a light sensing circuit for detecting a touch, wherein the light sensing circuit includes a photodiode including a cathode electrode and an anode electrode and for receiving light from the outside and generating a current corresponding to the received light, a driving transistor for amplifying the current generated in the photodiode, a capacitor for storing a first initiation voltage transmitted to the driving transistor, a first switching transistor for compensating for a threshold voltage of the driving transistor corresponding to a current scan signal, and a second switching transistor for transmitting the first initiation voltage corresponding to the current scan signal.

The driving transistor may be a PMOS transistor having a gate electrode connected to one terminal of the capacitor, a source electrode connected to the second switching transistor, and a drain electrode connected to the first switching transistor.

The first switching transistor may be a PMOS transistor having a source electrode connected to a drain electrode of the driving transistor and a drain electrode connected to a gate electrode of the driving transistor, and for compensating for a threshold voltage of the driving transistor by diode connecting the driving transistor corresponding to the current scan signal.

The touch panel may further include a third switching transistor for transmitting a second initiation voltage of the pixel driving circuit corresponding to a previous scan signal received before the current scan signal for initiating a voltage of the cathode electrode of the photodiode and a voltage at a gate electrode of the driving transistor.

The touch panel may further include a third switching transistor for transmitting a power source voltage of the pixel driving circuit to the driving transistor corresponding to an emission signal for the pixel driving circuit.

The touch panel may further include a third switching transistor for transmitting the current amplified by the driving transistor through an output line corresponding to a light integration signal.

The touch panel may further include a fourth switching transistor for resetting a voltage of the output line to a ground voltage corresponding to a reset signal.

According to some non-limiting example embodiments of the present invention, a method of driving a light sensing circuit includes: initiating a voltage of a gate electrode of a driving transistor and a voltage of a cathode electrode of a photodiode corresponding to a previous scan signal, diode connecting the driving transistor and storing a first initiation voltage transmitted to the driving transistor to a capacitor corresponding to a current scan signal, applying a power source voltage to a source electrode of the driving transistor corresponding to an emission signal and adjusting the first initiation voltage stored in the capacitor corresponding to a current generated in the photodiode, and amplifying the current generated in the photodiode and outputting the amplified current corresponding to a light integration signal.

The light sensing circuit may compensate for a deviation of a threshold voltage of the driving transistor.

DETAILED DESCRIPTION

Figure 1:
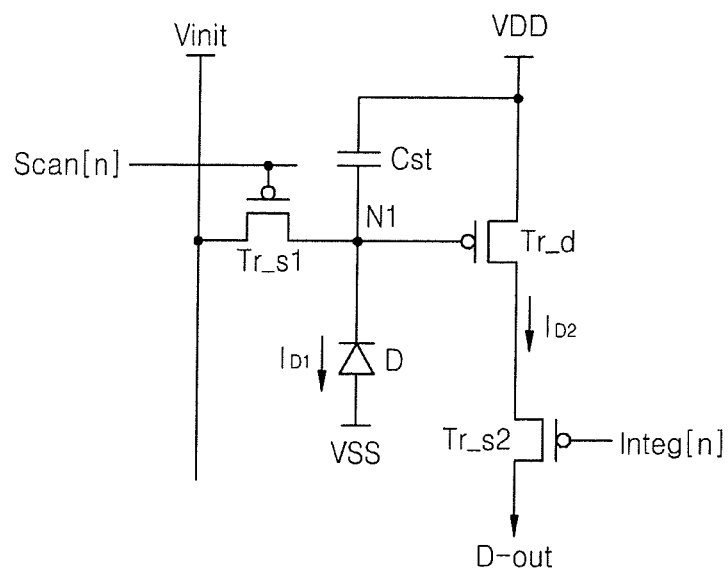
FIG. 1 is a circuit diagram of a light sensing circuit for amplifying a current generated in a photodiode according to a non-limiting example embodiment of the present invention.

Non-limiting example embodiments of the present invention will be hereinafter described in detail with reference to the accompanying drawings. i) The structural shapes, sizes, numbers, etc. are schematically illustrated in the accompanying drawings such that they may be altered more or less. ii) The drawings are shown from the viewpoint of observation such that the direction or location of explaining the drawings may be variously changed depending upon the positions of the observer. iii) Even when reference is made to different elements, like reference numerals may be used to designate those elements. iv) When the terms of 'include,' 'have,' 'consist of,' or the like are used, the relevant subject may include other parts unless the term 'only' is used to define the contents thereof. v) When explanation is made by way of a singular term, it may be interpreted in a plural manner as well as in a singular manner. vi) Even when the numerical values, shapes, size comparisons, positional relations, etc. are not explained with the adverb 'about' or 'substantially,' they may be so interpreted as to include the common error ranges. vii) Even when the terms of 'after,' 'before,' 'and,' 'here,' 'subsequently,' or the like are introduced, they are not meant to define the temporal locations. viii) The terms of 'the first,' 'the second,' . . . , etc. are used only for the convenience in distinction selectively, commutatively, or repeatedly, and not meant to be read in any defined manners. ix) It will be understood that when an element is referred to as being 'on,' 'over,' 'above,' 'below,' or 'beside' another element, it can be directly on the other element or one or more intervening elements may also be present. x) When the connective 'or' is used to connect two elements, it means to indicate the respective elements and a combination thereof, but when the quantifier 'any one of' is attached to the connective, it means to indicate only the respective elements.

Figure 2:
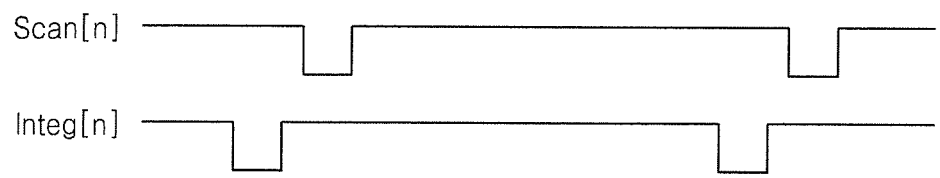
FIG. 2 is a timing diagram for driving the light sensing circuit of FIG. 1.

FIG. 1 is a circuit diagram of a light sensing circuit for amplifying a current generated in a photodiode according to a non-limiting example embodiment of the present invention, and FIG. 2 is a timing diagram for driving the light sensing circuit of FIG. 1.

Referring to FIG. 1, the light sensing circuit includes a photodiode D, a driving transistor Tr_d, a first switching transistor Tr_s1, a second switching transistor Tr_s2, and a capacitor Cst.

The photodiode D receives light incident from the outside and generates a current. The photodiode D includes an anode electrode and a cathode electrode. A ground voltage $V_{SS}$ is applied to the anode electrode of the photodiode D, and the cathode electrode is connected to a gate electrode of the driving transistor Tr_d at a node N1.

Unlike a general diode, the photodiode D is driven by a reverse bias voltage. Accordingly, an electric potential at the anode electrode may be lower than that at the cathode electrode. When light is incident onto the photodiode D from the outside while the reverse bias voltage is applied to the photodiode D, a current $I_{D1}$ is generated according to the brightness of light, corresponding to the reverse bias voltage and a photodiode area. However, since the photodiode D is included in a touch panel, the size of the photodiode D is limited, and the brightness of light may also be limited. In general, a current generated by a photodiode used for sensing light in a touch panel is on the order of a few to several tens of pA. Thus, the current of the photodiode may be amplified to improve a sensing accuracy of the light sensing circuit.

A power source voltage $V_{DD}$ is applied to a source electrode of the driving transistor Tr_d, and the gate electrode of the driving transistor Tr_d is connected to a drain electrode of the first switching transistor Tr_s1, the cathode electrode of the photodiode D, and one terminal of the capacitor Cst at the node N1.

A gate electrode of the first switching transistor Tr_s1 is connected to a scan line Scan[n] and an initiation voltage Vinit is applied to the source electrode of the first switching transistor Tr_s1. Here, the scan line Scan[n] may also be a scan line of a pixel driving circuit which drives a plurality of pixels. Thus, a separate signal line is not needed in the light sensing circuit.

A light integration line Integ[n] is connected to a gate electrode of the second switching transistor Tr_s2, a data output line D-out is connected to a drain electrode of the second switching transistor Tr_s2, and a current $I_{D2}$ generated by amplifying the current $I_{D1}$ of the photodiode D is output through the data output line D-out.

The other terminal of the capacitor Cst is connected to the source electrode of the driving transistor Tr_d, and the power source voltage $V_{DD}$ is applied to the source electrode. Here, the power source voltage $V_{DD}$ may also be a power source voltage of the pixel driving circuit. Accordingly, a separate power source line is not needed in the light sensing circuit. One terminal of the capacitor Cst is connected to the gate electrode of the driving transistor Tr_d, and a voltage Vgs between the gate electrode and source electrode of the driving transistor Tr_d is stored in the capacitor Cst.

The structure of the light sensing circuit of FIG. 1 is simple, and the layout only covers a small area. Accordingly, a light receiving area of the photodiode D may be increased, and thus the sensitivity of the touch panel including the photodiode D may be improved. Also, a scan signal line and a power source line are shared with the pixel driving circuit, so that separate signal lines and power source lines for the light sensing circuit are not needed.

Referring to FIG. 2, the first switching transistor Tr_s1 is turned on by a scan signal, and the initiation voltage Vinit is applied to the gate electrode of the driving transistor Tr_d. That is, the first switching transistor Tr_s1 is turned on by the scan signal and the initiation voltage Vinit of an initiation line is applied to the node N1 so that the gate electrode of the driving transistor Tr_d and a voltage at the cathode electrode of the photodiode D are initiated. Then, the photodiode D receives a light from an external light source or an internal light source, and integrates light for one frame time so that the current $I_{D1}$ is generated and a gate voltage of the driving transistor Tr_d decreases.

When the second switching transistor Tr_s2 is turned on by an integration signal Integ[n], the current $I_{D2}$ determined corresponding to the voltage Vgs between the gate electrode and the source electrode of the driving transistor Tr_d is output through the data output line D-out. The amplified current $I_{D2}$ may be calculated by using Equation 1 below.

$$I_{D2} = \frac{\beta}{2}(Vgs - Vth)^2 \qquad \text{Equation 1}$$
$$= \frac{\beta}{2}(V_{DD} - Vint - \Delta V - Vth)^2$$

Here, ΔV denotes a voltage change amount corresponding to a decrease in the voltage of the node N1, that is, the voltage of the gate electrode of the driving transistor Tr_d, due to the current $I_{D1}$ generated in the photodiode D, Vth denotes a threshold voltage of the driving transistor Tr_d, and β denotes a constant value.

As shown in Equation 1, the output current $I_{D2}$ of the light sensing circuit varies with the threshold voltage $V_{th}$ of the driving transistor Tr_d. The threshold voltages $V_{th}$ of driving transistors for amplifying a current vary due to fabrication and/or manufacturing variables of a thin film transistor (TFT). Therefore, it is very difficult to manufacture transistors having the same threshold voltages $V_{th}$. Accordingly, deviations of threshold voltages $V_{th}$ exist in each amplifying circuit, and thus the accuracy of touch determination or touch location determination is decreased or reduced.

Figure 3:
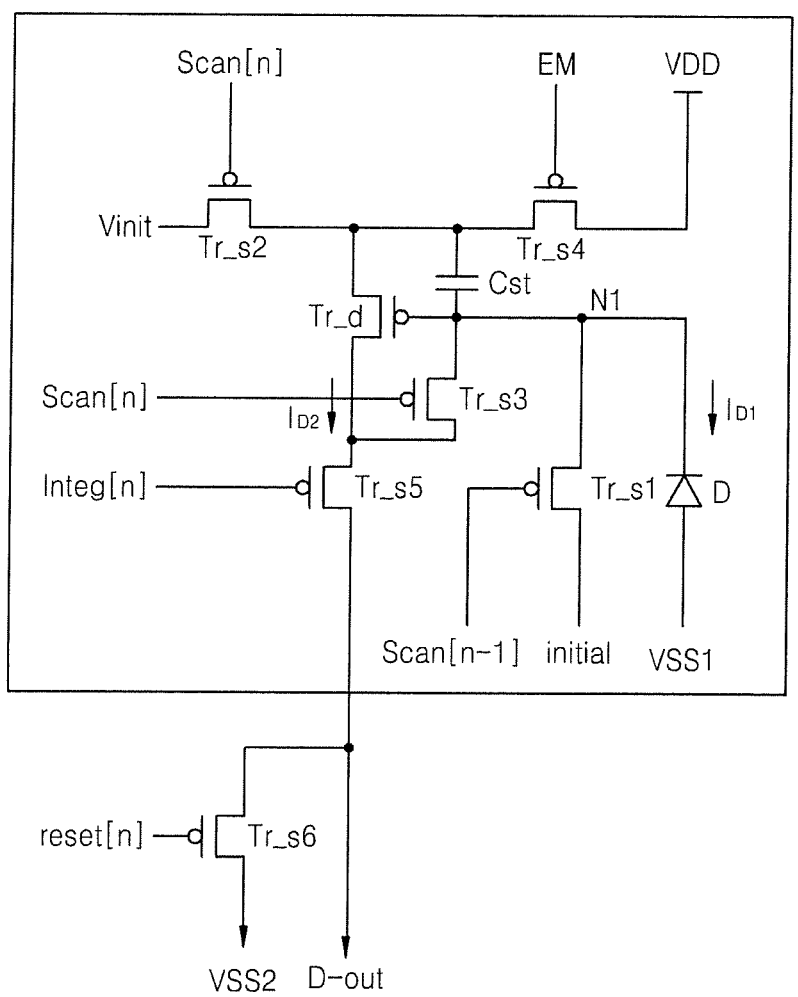
FIG. 3 is a circuit diagram of a light sensing circuit for amplifying a current generated in a photodiode according to another non-limiting example embodiment of the present invention.
Figure 4:
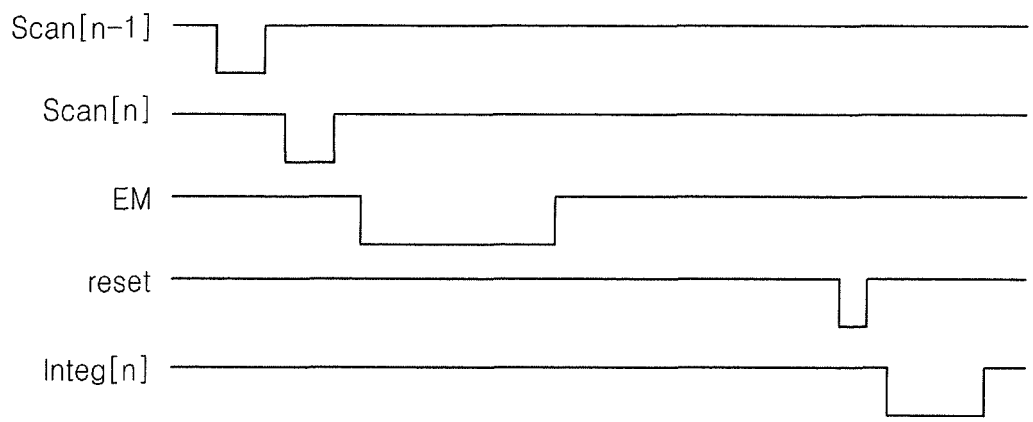
FIG. 4 is a timing diagram for driving the light sensing circuit of FIG. 3.

FIG. 3 is a diagram of a light sensing circuit for amplifying a current generated in a photodiode according to another non-limiting example embodiment of the present invention and FIG. 4 is a timing diagram for driving the light sensing circuit of FIG. 3.

Referring to FIG. 3, the light sensing circuit includes a photodiode D, a driving transistor Tr_d, first through sixth switching transistors Tr_s1 through Tr_s6, and a capacitor Cst.

The photodiode D receives light incident from the outside and generates a current. The photodiode D includes an anode electrode and a cathode electrode. A first ground voltage $V_{SS1}$ is applied to the anode electrode of the photodiode D, and the cathode electrode of the photodiode D is connected to a gate electrode of the driving transistor Tr_d at the node N1.

A source electrode of the driving transistor Tr_d is connected to a drain electrode of the second switching transistor Tr_s2, one terminal of the capacitor Cst, and a drain electrode of the fourth switching transistor Tr_s4.

An initiation voltage initial is applied to a source electrode of the first switching transistor Tr_s1, a gate electrode of the first switching transistor Tr_s1 is connected to a previous scan line Scan[n−1], and a drain electrode of the first switching transistor Tr_s1 is connected to the node N1. The first switching transistor Tr_s1 responds to a scan signal received directly before a current scan signal, that is, a previous scan signal Scan[n−1], and initiates the gate electrode of the driving transistor Tr_d and a voltage at the cathode electrode of the photodiode D.

An initiation voltage Vinit is applied to a source electrode of the second switching transistor Tr_s2, a gate electrode of the second switching transistor Tr_s2 is connected to a current scan line Scan[n], and a drain electrode of the second switching transistor Tr_s2 is connected to the source electrode of the driving transistor Tr_d. The second switching transistor Tr_s2 responds to the current scan signal Scan[n] and applies an initiation voltage Vinit (e.g., a voltage level data signal) to the source electrode of the driving transistor Tr_d.

A source electrode of the third switching transistor Tr_s3 is connected to the gate electrode of the driving transistor Tr_d, a drain electrode of the third switching transistor Tr_s3 is connected to the drain electrode of the driving transistor Tr_d, and a gate electrode of the third switching transistor Tr_s3 is connected to the current scan line Scan[n] so that the third switching transistor Tr_s3 is turned on in response to the current scan signal Scan[n] to diode connect the driving transistor Tr_d. The third switching transistor Tr_s3 diode connects the driving transistor Tr_d to compensate for a deviation of a threshold voltage Vth of the driving transistor Tr_d. The compensation of the threshold voltage Vth of the driving transistor Tr_d will be described later with reference to FIG. 4.

A power source voltage $V_{DD}$ is applied to a source electrode of the fourth switching transistor Tr_s4 and an emission line EM[n] is connected to a gate electrode of the fourth switching transistor Tr_s4, so that the power source voltage $V_{DD}$ is transmitted to the source electrode of the driving transistor Tr_d according to an emission signal from emission line EM[n]. Here, the power source voltage $V_{DD}$ may also be a power source voltage of a pixel driving circuit. Thus, a separate power source voltage line for the light sensing circuit is not needed.

A light integration line Integ[n] is connected to a gate electrode of the fifth switching transistor Tr_s5, a data output line D-out is connected to a drain electrode of the fifth switching transistor Tr_s5, a current $I_{D2}$, generated by amplifying a photodiode current $I_{D1}$ corresponding to light received by photodiode D, is output through the data output line D-out.

The sixth switching transistor Tr_s6 responds to a reset signal of a reset line reset[n] connected to a gate electrode of the sixth switching transistor Tr_s6 and initiates the data output line D-out by utilizing a second ground voltage $V_{ss2}$ applied to a drain electrode of the sixth switching transistor Tr_s6.

One terminal of the capacitor Cst is connected to the source electrode of the driving transistor Tr_d and selectively receives the power source voltage $V_{DD}$. Here, the power source voltage $V_{DD}$ may also be a power source voltage of a pixel driving circuit. The gate electrode of the driving transistor Tr_d is connected to the other terminal of the capacitor Cst, and a voltage Vgs between the gate electrode and source electrode of the driving transistor Tr_d is stored in the capacitor Cst.

The light sensing circuit of FIG. 3 can compensate for the threshold voltage of the driving transistor Tr_d, and deviations caused by differences or variations in the threshold voltages is smaller. Also, a scan signal line and a power source line are shared with the pixel driving circuit so that separate signal lines and power source lines for the light sensing circuit are not needed.

Referring to FIG. 4, the first switching transistor Tr_s1 is turned on by the previous scan signal Scan[n−1] and a voltage at the node N1 is initiated. That is, the gate electrode of the driving transistor Tr_d and the cathode electrode of the photodiode D are initiated. The second and third switching transistors Tr_s2 and Tr_s3 are turned on by the current scan signal Scan[n]. The third switching transistor Tr_s3 is turned on for the driving transistor Tr_d to be diode connected. The second switching transistor Tr_s2 is turned on, and the initiation voltage Vinit is applied to the gate electrode of the driving transistor Tr_d by diode connection. Here, a voltage difference between the initiation voltage Vinit and the threshold voltage Vth is stored in the capacitor Cst.

The fourth switching transistor Tr_s4 is turned on by the emission signal EM[n] and the power source voltage $V_{DD}$ is applied to the source electrode of the driving transistor Tr_d. According to light emission, the photodiode D integrates light for one frame period, and thus the current $I_{D1}$ flows so that the voltage at the node N1, that is, the voltage at the gate electrode of the driving transistor Tr_d, decreases in correspondence to the generated current $I_{D1}$. That is, the voltage $V_G$ of the gate electrode decreases by $\Delta V$. Accordingly, a voltage decrease corresponding to light reaction is represented in the capacitor Cst.

Then, the sixth switching transistor Tr_s6 is turned on by the reset signal, and the data output line D-out is initiated. The fifth switching transistor Tr_s5 is turned on by the light integration signal Integ[n] and thus the current $I_{D2}$, generated by amplifying the photodiode current $I_{D1}$, is output through the data output line D-out. That is, a data value in response to sensed light, that is, the current $I_{D2}$, is output. The amplified current $I_{D2}$ may be calculated by using Equation 2 below.

$$I_{D2} = \frac{\beta}{2}(Vgs - Vth)^2 \qquad \text{Equation 2}$$
$$= \frac{\beta}{2}(V_{DD} - (V_{init} - V_{th}) - \Delta V - V_{th})^2$$
$$= \frac{\beta}{2}(V_{DD} - V_{init} - \Delta V)^2$$

Here, $\Delta V$ denotes a voltage change amount corresponding to a decrease in the voltage of the node N1, that is, the voltage of the gate electrode of the driving transistor Tr_d, due to the current $I_{D1}$ generated in the photodiode D, Vth denotes a threshold voltage of the driving transistor Tr_d, and β denotes a constant value.

As shown in Equation 2, the output current $I_{D2}$ of the light sensing circuit does not vary with variations in the threshold voltage $V_{th}$ of the driving transistor Tr_d. Accordingly, regular output data may be obtained from the light sensing circuit regardless of a deviation of the threshold voltage $V_{th}$ of the driving transistor Tr_d, and thus the touch or touch location may be more accurately determined.

Figure 5:
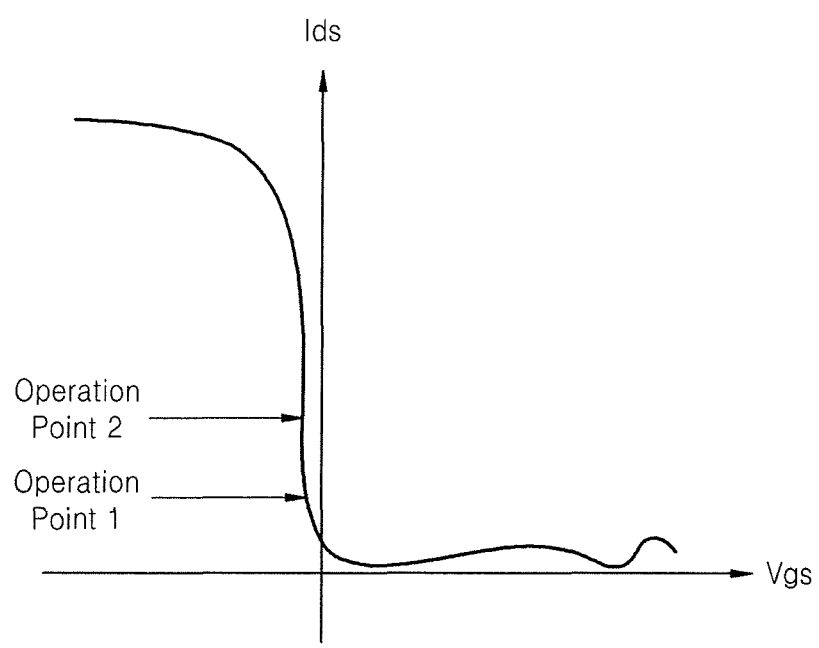
FIG. 5 is a graph of current versus voltage for illustrating operation points of the light sensing circuit of FIG. 3.

FIG. 5 is a graph of output current versus voltage for illustrating operation points of the light sensing circuit of FIG. 3.

Referring to FIG. 5, the graph illustrates an output current Ids with respect to the voltage Vgs between the gate electrode and source electrode of the driving transistor. Slopes at operation points 1 and 2 are different from each other. Referring back to FIG. 4, when the driving transistor Tr_d is diode connected by the scan signal scan [n], the initiation voltage Vinit is applied to the driving transistor Tr_d. Here, when a low voltage is applied, the final output voltage Vgs increases and thus the light sensing circuit may be driven at, for example, operation point 1 or 2. Accordingly, a change of Ids increases with respect to a small change of Vgs, and thus current values of the photodiode due to light reaction may be amplified, and sensitivity can be improved.

Figure 6:
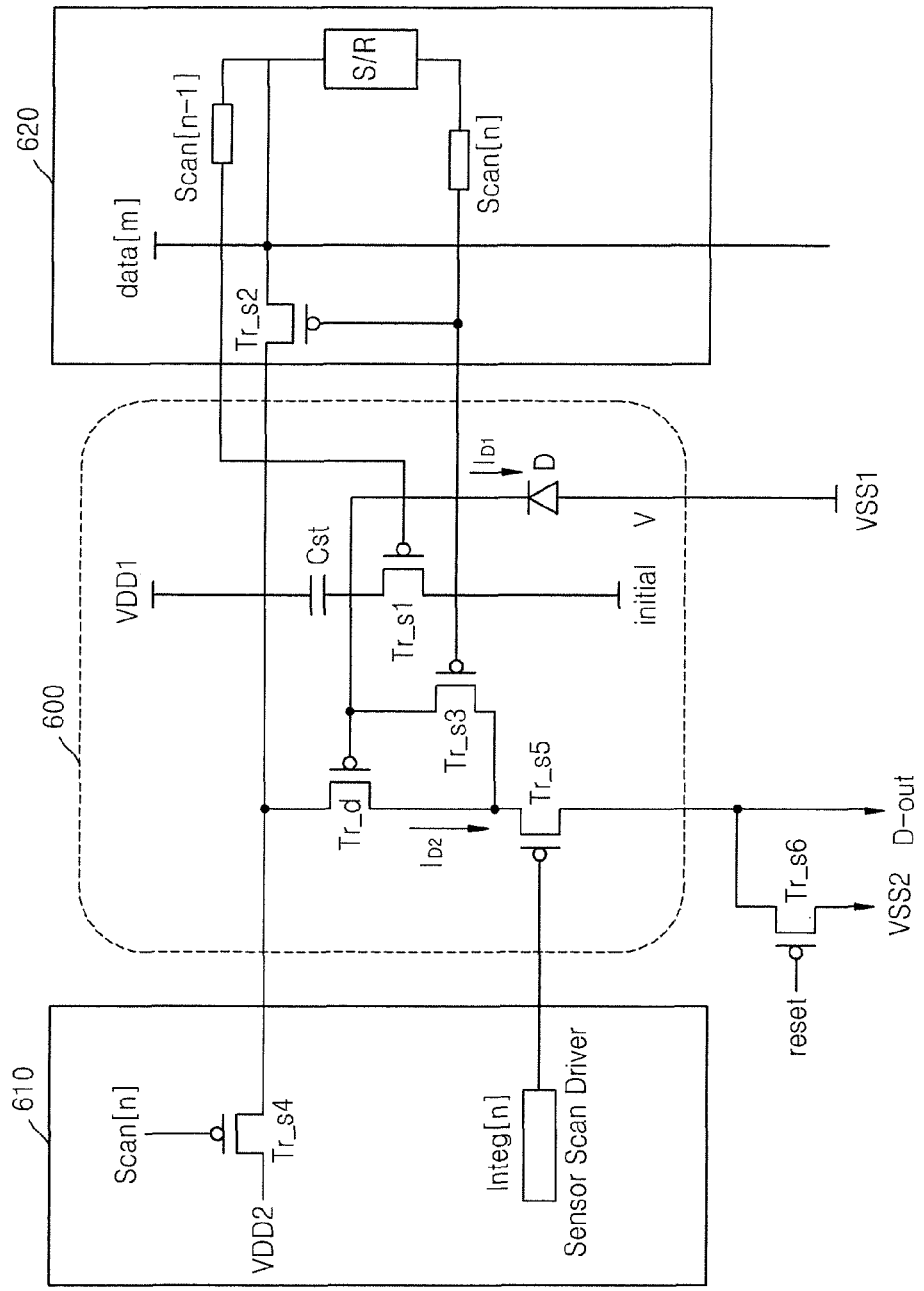
FIG. 6 is a circuit diagram of a light sensing circuit for amplifying a current generated in a photodiode according to another non-limiting example embodiment of the present invention.

FIG. 6 is a diagram of a light sensing circuit for amplifying a current generated in a photodiode according to another non-limiting example embodiment of the present invention.

Referring to FIG. 6, the light sensing circuit of FIG. 6 is different from the light sensing circuit of FIG. 3 in that the second switching transistor Tr_s2 and the fourth switching transistor Tr_s4 are disposed outside of a touch panel 600, for example, in a pixel emission driver 610 and a pixel scan driver 620, respectively. Accordingly, the light sensing circuit of FIG. 6 may compensate for the threshold voltage Vth of the driving transistor Tr_d), increase the area of the light sensing circuit in the panel, and allow an increase in the size of the photodiode. The operation of the light sensing circuit of FIG. 6 is similar to that of the light sensing circuit of FIG. 3, and hereinafter, only the structural differences are described.

Both voltages, that is, data[m] and $V_{DD2}$, may be applied to the second switching transistor Tr_s2 and the fourth switching transistor Tr_s4 through one line. Also, the second and fourth switching transistors Tr_s2 and Tr_s4 may be disposed outside the touch panel 600, and thus signals and power sources of circuits in the touch panel 600 may be used. Thus, a layout area of the light sensing circuit may be secured without additional internal circuits. Here, $V_{DD2}$ may be an emission power source EM VDD of the pixel emission driver 610, and VDD1 may be a power source of a pixel driving circuit. As such, a separate power source is used, so as to share the power source voltage of a pixel, and thus an image on the touch panel 600 may be less affected.

Only one light sensing circuit is illustrated in the touch panel 600. However, the pixel driving circuits for driving a plurality of pixels in an nxm matrix are included in the touch panel 600, and the light sensing circuits respectively corresponding to the pixel driving circuits are also included in the touch panel 600.

Here, the pixel driving circuit may be a pixel circuit of an organic light emitting device (OLED). As an example of an organic light emitting display circuit, a 2-transistor and 1-capacitor type pixel circuit including a first transistor tr1, a second transistor tr2, a capacitor $C_{st}$, and an OLED may be used. In the pixel circuit, data may be displayed in the same or a similar manner as in a general OLED, and a detailed operation thereof is omitted. Also, the pixel driving circuit described above is only an example, and various well known pixel driving circuits may be used.

According to non-limiting example embodiments of the present invention, the scan line is shared by the pixel driving circuit and the light sensing circuit, so that the amount of wiring for driving the touch panel and the number of drivers for generating driving signals may be reduced. In addition, the light sensing circuit compensates for the threshold voltage of the driving transistor used to amplify a current of the photodiode, and thus more uniform output data may be obtained.

In the non-limiting example embodiments described above, the driving transistors and the switching transistors are illustrated as PMOS transistors. However, the driving transistors and the switching transistors may alternatively be formed as NMOS transistors or CMOS transistors.

According to non-limiting example embodiments of the present invention, the light sensing circuit may amplify the current generated in the photodiode and compensate for the threshold voltage of the transistors, thereby more accurately performing light sensing.

While this disclosure has been described in connection with what is presently considered to be practical non-limiting example embodiments, it is to be understood that the invention is not limited to the disclosed non-limiting example embodiments, but is instead intended to cover various modifications and equivalent arrangements included within the spirit and scope of the appended claims.

What is claimed is:

1. A light sensing circuit for amplifying a current of a photodiode, comprising:
   a photodiode comprising a cathode electrode and an anode electrode and for receiving light from the outside and generating a current corresponding to the received light;
   a driving transistor for amplifying the current generated in the photodiode;
   a capacitor for storing a first initiation voltage transmitted to the driving transistor;
   a first switching transistor for compensating for a threshold voltage of the driving transistor corresponding to a current scan signal; and
   a second switching transistor for transmitting the first initiation voltage corresponding to the current scan signal by diode connecting the driving transistor.

2. The light sensing circuit of claim 1, wherein the driving transistor is a PMOS transistor having a gate electrode connected to one terminal of the capacitor, a source electrode connected to the second switching transistor, and a drain electrode connected to the first switching transistor.

3. The light sensing circuit of claim 1, wherein the first switching transistor is a PMOS transistor having a source electrode connected to a drain electrode of the driving transistor and a drain electrode connected to a gate electrode of the driving transistor, and for compensating for a threshold voltage of the driving transistor by diode connecting the driving transistor corresponding to the current scan signal.

4. The light sensing circuit of claim 1, further comprising a third switching transistor for transmitting a second initiation voltage which initiates a voltage of the cathode electrode of the photodiode and a voltage at a gate electrode of the driving transistor corresponding to a previous scan signal received before the current scan signal.

5. The light sensing circuit of claim 4, further comprising a fourth switching transistor for transmitting a power source voltage to the driving transistor corresponding to an emission signal.

6. The light sensing circuit of claim 5, wherein the second initiation voltage and the power source voltage are respectively the same as a corresponding initiation voltage and a corresponding power source voltage of a separate pixel driving circuit which drives a plurality of pixels.

7. The light sensing circuit of claim 5, wherein the fourth switching transistor is comprised in a pixel emission driver which transmits an emission signal to a separate pixel driving circuit which drives a plurality of pixels.

8. The light sensing circuit of claim 1, further comprising a third switching transistor for transmitting the current amplified through the driving transistor via an output line corresponding to a light integration signal.

9. The light sensing circuit of claim 8, further comprising a fourth switching transistor for resetting a voltage of the output line to a ground voltage corresponding to a reset signal.

10. The light sensing circuit of claim 1, wherein the second switching transistor is comprised in a pixel scan driver which transmits a scan signal to a separate pixel driving circuit which drives a plurality of pixels.

11. A touch panel comprising a pixel driving circuit for driving a plurality of pixels for displaying images and a light sensing circuit for detecting a touch, wherein the light sensing circuit comprises a photodiode comprising a cathode electrode and an anode electrode and for receiving light from the outside and generating a current corresponding to the received light; a driving transistor for amplifying the current generated in the photodiode; a capacitor for storing a first initiation voltage transmitted to the driving transistor; a first switching transistor for compensating for a threshold voltage of the driving transistor corresponding to a current scan signal; and a second switching transistor for transmitting the first initiation voltage corresponding to the current scan signal by diode connecting the driving transistor.

12. The touch panel of claim 11, wherein the driving transistor is a PMOS transistor having a gate electrode connected to one terminal of the capacitor, a source electrode connected to the second switching transistor, and a drain electrode connected to the first switching transistor.

13. The touch panel of claim 11, wherein the first switching transistor is a PMOS transistor having a source electrode connected to a drain electrode of the driving transistor and a drain electrode connected to a gate electrode of the driving transistor, and for compensating for a threshold voltage of the driving transistor by diode connecting the driving transistor corresponding to the current scan signal.

14. The touch panel of claim 11, further comprising a third switching transistor for transmitting a second initiation voltage of the pixel driving circuit corresponding to a previous scan signal received before the current scan signal for initiating a voltage of the cathode electrode of the photodiode and a voltage at a gate electrode of the driving transistor.

15. The touch panel of claim 11, further comprising a third switching transistor for transmitting a power source voltage of the pixel driving circuit to the driving transistor corresponding to an emission signal for the pixel driving circuit.

16. The touch panel of claim 11, further comprising a third switching transistor for transmitting the current amplified by the driving transistor through an output line corresponding to a light integration signal.

17. The touch panel of claim 16, further comprising a fourth switching transistor for resetting a voltage of the output line to a ground voltage corresponding to a reset signal.

18. A method of driving a light sensing circuit, the method comprising:
- initiating a predetermined voltage at a gate electrode of a driving transistor and at a cathode electrode of a photodiode corresponding to a previous scan signal;
- diode connecting the driving transistor and storing a first initiation voltage transmitted to the driving transistor to a capacitor corresponding to a current scan signal;
- applying a power source voltage to a source electrode of the driving transistor corresponding to an emission signal and adjusting the first initiation voltage stored in the capacitor corresponding to a current generated in the photodiode; and
- amplifying the current generated in the photodiode and outputting the amplified current corresponding to a light integration signal.

19. The method of claim 18, wherein the light sensing circuit compensates for a deviation of a threshold voltage of the driving transistor.

* * * * *